US007596439B2

(12) United States Patent
Oesterling et al.

(10) Patent No.: US 7,596,439 B2
(45) Date of Patent: Sep. 29, 2009

(54) METHOD FOR CONTROLLING A REMOTE MONITORING DEVICE

(75) Inventors: Christopher L. Oesterling, Troy, MI (US); Nathan D. Ampunan, West Bloomfield, MI (US); Daniel C. McGarry, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 770 days.

(21) Appl. No.: 11/038,937

(22) Filed: Jan. 20, 2005

(65) Prior Publication Data

US 2006/0158349 A1 Jul. 20, 2006

(51) Int. Cl.
*G06F 7/00* (2006.01)

(52) U.S. Cl. ......................... 701/38; 702/182; 702/183; 702/188; 340/870.07; 348/143; 348/148

(58) Field of Classification Search ............ 340/870.01, 340/870.07; 701/36, 202, 29; 348/143, 148; 702/182–183, 188

See application file for complete search history.

(56) References Cited

U.S. PATENT DOCUMENTS

| | | | | |
|---|---|---|---|---|
| 5,619,412 | A * | 4/1997 | Hapka | 701/36 |
| 5,794,164 | A * | 8/1998 | Beckert et al. | 455/3.06 |
| 6,161,071 | A * | 12/2000 | Shuman et al. | 701/48 |
| 6,295,492 | B1 * | 9/2001 | Lang et al. | 701/33 |
| 6,484,080 | B2 * | 11/2002 | Breed | 701/36 |
| 6,735,506 | B2 * | 5/2004 | Breed et al. | 701/36 |
| 7,082,359 | B2 * | 7/2006 | Breed | 701/36 |
| 2003/0193390 | A1 | 10/2003 | Muramatsu | 340/426.13 |
| 2004/0123328 | A1 * | 6/2004 | Coffey et al. | 725/105 |
| 2006/0158349 | A1 * | 7/2006 | Oesterling et al. | 340/870.07 |
| 2007/0242661 | A1 * | 10/2007 | Tran | 370/352 |
| 2007/0249422 | A1 * | 10/2007 | Podoloff | 463/43 |
| 2007/0286138 | A1 * | 12/2007 | Kaftan | 370/338 |
| 2009/0006846 | A1 * | 1/2009 | Rosenblatt | 713/159 |

FOREIGN PATENT DOCUMENTS

| | | | | |
|---|---|---|---|---|
| FR | 2898718 | A1 * | 9/2007 |
| FR | EP 2010975 | A2 * | 1/2009 |
| WO | WO 2007104868 | A2 * | 9/2007 |
| WO | WO 2007104868 | A3 * | 11/2007 |
| WO | WO 2008137765 | A1 * | 11/2008 |

OTHER PUBLICATIONS

Next Generation Vehicle Network: Web Enabled; Mahfoud, M.; Al-Holou, N.; Baroody, R.; Information and Communication Technologies: From Theory to Applications, 2008. ICTTA 2008. 3rd International Conference on, Apr. 7-11, 2008 pp. 1-7 Digital Object Identifier 10.1109/ICTTA.2008.4529964.*

(Continued)

*Primary Examiner*—Cuong H Nguyen

(57) ABSTRACT

A method of controlling a remote monitoring device from a vehicle includes sending a command signal from a telematics unit via a wi-fi connection to the remote monitoring device and receiving data from the remote monitoring device via a wi-fi connection at the telematics unit. The data is sent to a destination via a wireless network.

7 Claims, 2 Drawing Sheets

OTHER PUBLICATIONS

A Runtime Monitoring Environment for Mobile Java; Martinelli, F.; Mori, P.; Quillinan, T.; Schaefer, C.; Software Testing Verification and Validation Workshop, 2008. ICSTW '08. IEEE International Conference on; Apr. 9-11, 2008 pp. 270-278 Digital Object Identifier 10.1109/ICSTW.2008.3.*

Special report: Manufacturing IT—Smart talk; Conti, J.P.; Manufacturing Engineer vol. 86, Issue 2, Apr.-May 2007 pp. 20-23.*

Enhancing Privacy Preservation of Anonymous Location Sampling Techniques in Traffic Monitoring Systems; Hoh, Baik; Gruteser, Marco; Xiong, Hui; Alrabady, Ansaf; Securecomm and Workshops, 2006; Aug. 28-Sep. 1, 2006 pp. 1-3 Digital Object Identifier 10.1109/SECCOMW.2006.359553.*

Mobile Wireless Sensor Network: Architecture and Enabling Technologies for Ubiquitous ComputingMunir, S.A.; Biao Ren; Weiwei Jiao; Bin Wang; Dongliang Xie; Man Ma; Advanced Information Networking and Applications Workshops, 2007, AINAW '07. 21st International Conference on;vol. 2, May 21-23, 2007 pp. 113-120, Digital Object Identifier 10.1.*

IPv6 on DSL: the best way to develop always-on services; Cocquet, P.;; Proceedings of the IEEE; vol. 92, Issue 9, Sep. 2004 pp. 1400-1407; Digital Object Identifier 10.1109/JPROC.2004.832957.*

CAN in Automation, Controller Area Network (CAN); [Online]. Available: http://www.can-cia.de/ [Accessed, Feb. 1, 2008].*

S. Duri, M. Gruteser, X. Liu, P. Moskowitz, R. Perez, M; Singh, and J.-M. Tang, "Framework for Security and Privacy in Automotive Telematics", International Conference on Mobile Computing and Networking, ACM Press, Atlanta, Georgia, USA, 2002, pp. 25-32.*

* cited by examiner

METHOD FOR CONTROLLING A REMOTE MONITORING DEVICE

FIELD OF THE INVENTION

This invention relates generally to methods of controlling remote monitoring devices. In particular, the invention relates to controlling remote monitoring devices in communication with telematics systems.

BACKGROUND OF THE INVENTION

Monitoring an environment from a distance has disadvantages. For example, an environment may be wet, shorting out electronic equipment. Other applications require only intermittent monitoring, such as monitoring upon occurrence of a predetermined event. Further, transmitting monitoring data to a destination can be difficult.

It is therefore desirable to provide a method of controlling a remote monitoring device that overcomes the limitations, challenges, and obstacles described above.

SUMMARY OF THE INVENTION

One aspect of the present invention provides a method of controlling a remote monitoring device from a vehicle. The method includes sending a command signal from a telematics unit via a wi-fi connection to the remote monitoring device. The method further includes receiving data from the remote monitoring device via a wi-fi connection at the telematics unit, and sending the data to a destination via a wireless network.

Another aspect of the present invention provides a computer usable medium encoded with computer readable code for controlling a remote monitoring device from a vehicle. The computer readable code includes computer readable code for sending a command signal from a telematics unit via a wi-fi connection to the remote monitoring device and computer readable code for receiving data from the remote monitoring device via a wi-fi connection at the telematics unit. Additionally, the medium includes computer readable code for sending the data to a destination via a wireless network.

A third aspect of the present invention provides a system for controlling a remote monitoring device from a vehicle. The system includes means for sending a command signal from a telematics unit via a wi-fi connection to the remote monitoring device, means for receiving data from the remote monitoring device via a wi-fi connection at the telematics unit; and means for sending the data to a destination via a wireless network.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
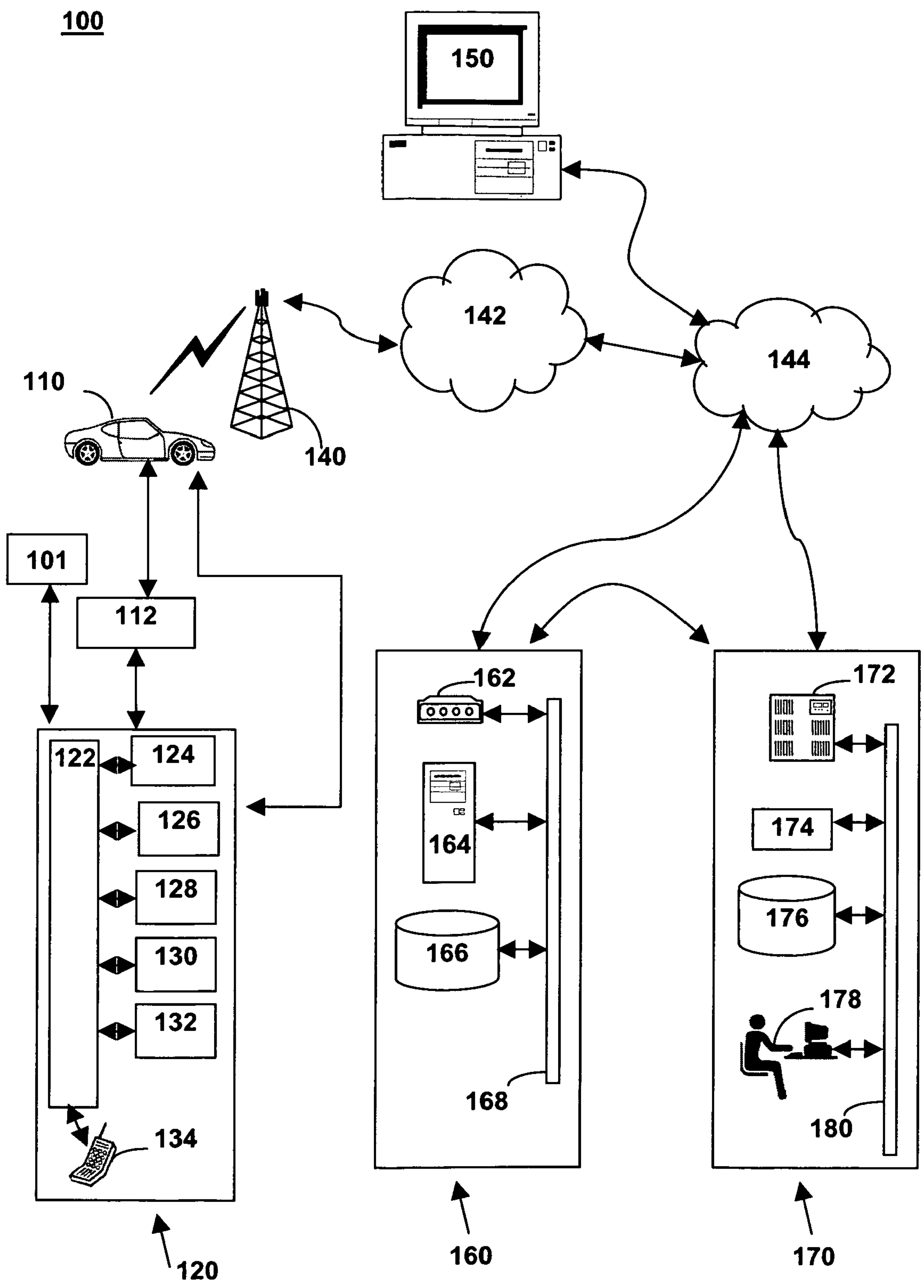
FIG. 1 is a schematic diagram of one embodiment of a system for controlling a remote monitoring device in accordance with the present invention.

FIG. 1 illustrates one embodiment of a system for controlling a remote monitoring device in accordance with the present invention at 100. System 100 includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. In an example, a display is embedded in MVCU 110. The display is a dialed digital display such as a radio unit or an instrument panel. MVCS 100 may include additional components not relevant to the present discussion.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

Remote monitoring device 101 is in wireless electronic communication with telematics unit 120. Wireless electronic communication exists over a wi-fi connection established between the remote monitoring device 101 and telematics unit 120. A wi-fi connection establishes communication with a protocol for short-range electronic communication such as a FCC Part 15 protocol, 802.11 (b, g, etc.), Bluetooth®, or other similar protocols. Remote monitoring device 101 is any device configured to monitor the environment in an area adjacent the remote monitoring device, and configured to be compatible with a wi-fi connection. In one embodiment, remote monitoring device 101 is capable of monitoring any physical, chemical, electrical, magnetic, nuclear, or other phenomena in the environment as desired for a particular application. In one embodiment, remote monitoring device 101 is a camera. In one embodiment, remote monitoring device 101 is a Geiger counter. In another embodiment, remote monitoring device 101 is a video camera. In another embodiment, remote monitoring device 101 is a digital camera. In one embodiment, remote monitoring device 101 is an audio device. In another embodiment, remote monitoring device 101 is a data collection device. As used herein, audio device includes any device configured to record sounds surrounding the remote monitoring device. In one embodiment, remote monitoring device 101 includes memory devices, such as those known in the art, for storing data obtained by operation of the remote monitoring devices. Memory devices include, but are not limited to, removable media, hard drives, flash memory, floppy discs, or the like.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 can reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends data transmissions to or receives data transmissions from one or more databases 166 via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers

174, one or more communication services databases 176, one or more communication services advisors 178, and one or more network systems 180.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends data transmissions to or receives data transmissions from one or more communication services databases 176 via network system 180. Communication services manager 174 sends data transmissions to or receives data transmissions from one or more communication services advisors 178 via network system 180. Communication services database 176 sends data transmissions to or receives data transmissions from communication services advisor 178 via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

Figure 2:
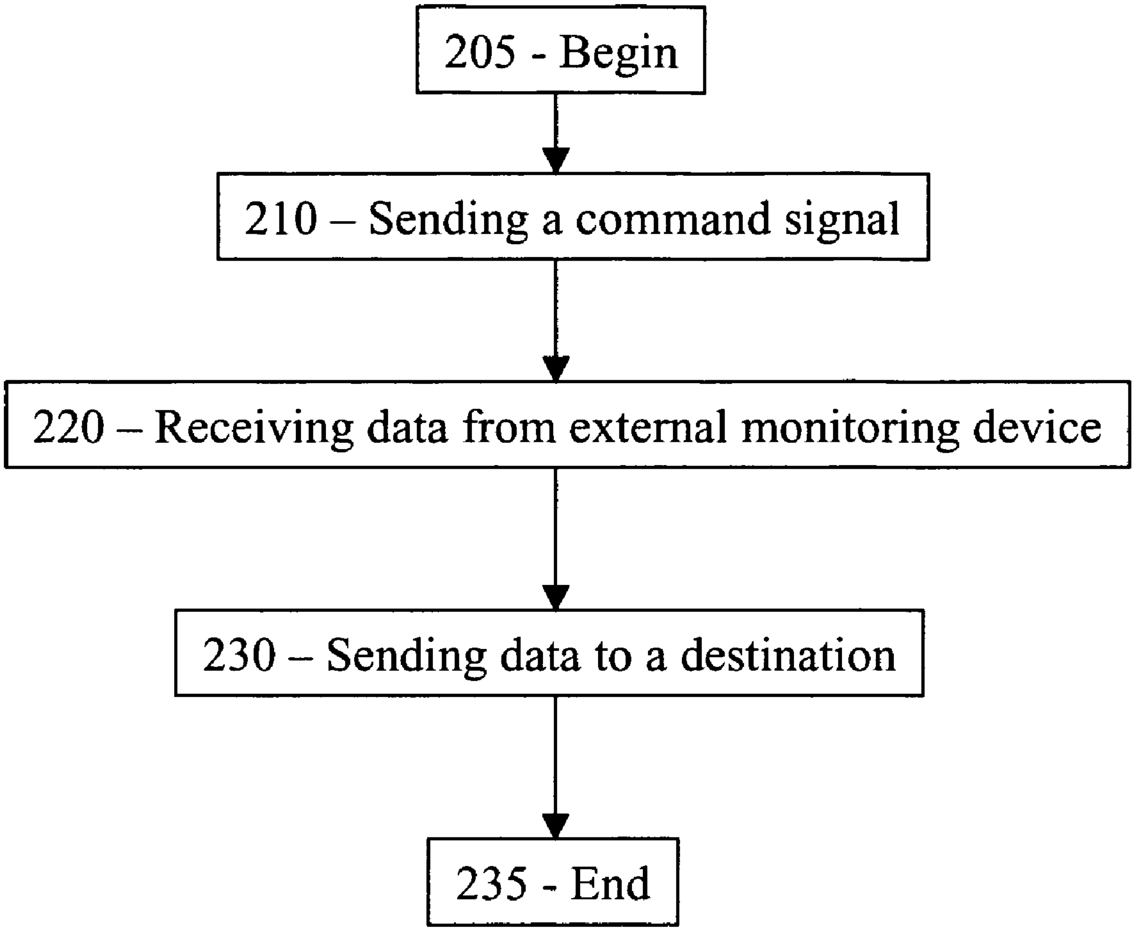
FIG. 2 is a flowchart representative of one embodiment of a method for controlling a remote monitoring device in accordance with the present invention.

FIG. 2 illustrates a flowchart 200 representative of one embodiment of a method for controlling a remote monitoring device from a vehicle. Method 200 begins at 205.

A command signal is sent from a telematics unit to a remote monitoring device via a wi-fi connection at 210. In one embodiment, the telematics unit is implemented as telematics unit 120 of FIG. 1. In one embodiment, the remote monitoring device is implemented as remote monitoring device 101 of FIG. 1. A command signal is any signal that includes an instruction for the remote monitoring device to take a particular action. For example, a command signal may instruct the remote monitoring device to take a picture. In another example, the command signal instructs the remote monitoring device to begin recording. In yet another example, the command signal includes an instruction to take a series of pictures at a predetermined interval. In one embodiment, the command signal includes instructions for the remote monitoring device to transmit data to the telematics unit.

In one embodiment, the command signal is sent to the telematics unit from a command source. A command source may be a user operating a controller configured to issue a command signal. In one embodiment, the telematics unit receives the command signal via a wi-fi network. In another embodiment, the telematics unit receives the command signal over a wireless network. In yet another embodiment, the telematics unit receives the command signal from a subcarrier of a satellite radio broadcast.

In another embodiment, the command signal is sent in response to a trigger. A trigger is any event that is intended to result in activation of the remote monitoring device. For example, an odometer trigger results in activation of the remote monitoring device when the vehicle travels, for example, 10 miles. In such an example, a camera mounted to the front of the vehicle will take a picture every 10 miles. In another example, the trigger is a time trigger. For example, a camera will take a picture every 30 minutes. In another example, the telematics unit will periodically "wake up" and activate the remote monitoring device. The trigger is a speedometer trigger, activated by a particular speed, in another example. Other triggers include ignition triggers (every 3 ignition cycles), event trigger (such as airbag deployment), or a GPS trigger (at a particular GPS location).

In yet another embodiment, the trigger is a monitoring trigger, and activates when the telematics unit comes within range of a particular remote monitoring device. For example, a law enforcement agency mounts a camera to a street light, and positions vehicles within range of the remote monitoring device. Thus, monitoring may be concealed by alternating the model vehicle that is within range of the remote monitoring device.

In another embodiment, a particular telematics unit is matched to a particular remote monitoring device, and the presence of the matched combination triggers the remote monitoring device.

In response to receiving the command signal, the remote monitoring device activates. For example, the remote monitoring device takes a picture in response to an appropriate command signal. In one embodiment, the remote monitoring device stores data recorded or obtained by activation on media prior to transmitting the data to the telematics unit. After activating and obtaining data, remote monitoring device transmits the data to the telematics unit via a wi-fi connection.

Data from the remote monitoring device is received at the telematics unit via a wi-fi connection at 220. The telematics unit stores the data in one embodiment. For example, data is stored in memory 138.

Data is sent to a destination via a wireless network by the telematics unit at 230. The destination for the data is the call center, in one embodiment. In another embodiment, the destination is a user computer, e.g. computer 150, or other user device. If the call center is the destination, in one embodiment, the data is then transmitted to a user computer or device. The data may be sent in any appropriate method, such as email, ftp, or other transfer mechanism. In one embodiment, the wireless network is implemented as system 140.

Method 200 ends at 235.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system for controlling a remote monitoring device from a vehicle, the system comprising:

means for sending a command signal from a telematics unit via a wi-fi connection to the remote monitoring device;

means for receiving data from the remote monitoring device via a wi-fi connection at the telematics unit; and means for sending the data to a destination via a wireless system, wherein the command signal is sent responsive to a trigger comprising at least one of the group consisting of an odometer trigger, a time trigger, a speedometer trigger, an ignition trigger, event trigger, GPS trigger, or a monitoring trigger.

2. The system of claim 1 wherein the remote monitoring device comprises a device selected from the group consisting of: a camera, an audio device, a Geiger counter, a data collection device, and a video camera.

3. The system of claim 1 wherein the means for sending a command signal form the telematics unit via wi-fi connection to the remote monitoring device comprises means for sending one or more signals that have been received by the telematics unit form a command source to the remote monitoring device.

4. The system of claim 3 wherein the means for sending one or more signals that have been received by the telematics unit form a command source to the remote monitoring device further comprise means for sending one or more signals that have been received by the telematics unit from a remote command source to the remote monitoring device.

5. The system of claim 1 wherein the means for sending the data to a destination via a wireless system comprise means for sending the data to call center.

6. The system of claim 1 wherein the means for sending a command signal from a telematics unit via a wi-fi connection to the remote monitoring device comprise means for sending a command signal from a telematics unit to the remote monitoring device via wireless packet data connection configured to comply with a protocol for wireless communication selected from the group consisting of 802.11, Bluetooth, and FCC Park 15.

7. The system of claim 1 wherein the means for receiving data from the remote monitoring device via wi-fi connection at the telematics unit comprise means for receiving data from the remote monitoring device at the telematics unit via a wireless packet data connection configured to comply with a protocol for wireless communication selected from the group consisting of 802.11, Bluetooth, and FCC Part 15.

* * * * *